United States Patent [19]

Szabo et al.

[11] 4,211,105
[45] Jul. 8, 1980

[54] METHOD FOR MEASURING THE DAMPING COEFFICIENT OF TORSIONAL-VIBRATION DAMPERS

[75] Inventors: Imre Z. Szabó; Kornél Nagy; Csaba Finta, all of Győr, Hungary

[73] Assignee: Magyar Vagon-és Gépgyár, Győr, Hungary

[21] Appl. No.: 961,568

[22] Filed: Nov. 17, 1978

Related U.S. Application Data

[62] Division of Ser. No. 789,095, Apr. 20, 1977, Pat. No. 4,166,377.

[30] Foreign Application Priority Data

Apr. 27, 1976 [HU] Hungary ................................ 2765

[51] Int. Cl.² .......................................... G01M 13/00
[52] U.S. Cl. ...................................................... 73/11
[58] Field of Search ................ 73/11, 1 D, 12, 517 A, 73/67.1, 67.2, 70.1

[56] References Cited

U.S. PATENT DOCUMENTS

| | | | |
|---|---|---|---|
| 1,891,613 | 12/1932 | Widney | 73/11 |
| 3,105,381 | 10/1963 | Collette | 73/67.2 |
| 3,955,400 | 5/1976 | Parker | 73/11 |

*Primary Examiner*—S. Clement Swisher
*Assistant Examiner*—Denis E. Corr

[57] ABSTRACT

Measuring method for quickly checking the damping coefficient of torsion-vibration dampers filled with a viscous liquid and being provided with a swing ring. The basic principle relates to the recognition that there is a well measurable, numerically characterizable relation between the damping coefficient of a damper of a given nominal geometry and the number of vibrations of the freely oscillating system into which the damper being tested is fitted. An exemplary, preferred apparatus is described for carrying out the method. The method comprises the steps of determining permissible limit values of the torsional vibration damping coefficient in the vibration system; establishing a characteristic curve of a relation between the coefficient and the number of vibrations of the decay from a determined initial amplitude to a second determined amplitude within the vibration system; tuning the system by one of several expedients; producing the free oscillation with damping within the system; measuring the number of the vibrations in the system upon the characteristic curve; and taking the measured number as a basis between permissible limit values to verify the acceptable quality of the damper, while an inferior quality is being declared at measured values that lie outside the limit values.

4 Claims, 5 Drawing Figures

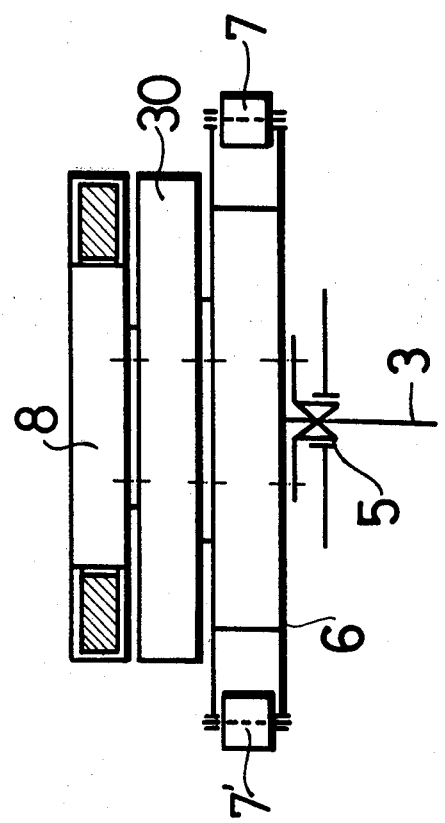

METHOD FOR MEASURING THE DAMPING COEFFICIENT OF TORSIONAL-VIBRATION DAMPERS

This application is a division of case Ser. No. 789,095 filed Apr. 20, 1977 now U.S. Pat. No. 4,166,377.

The invention relates to a measuring method for the quick checking of the damping coefficient of torsional-vibration dampers filled up with a viscous liquid and provided with a swing ring.

As it is well known, such a torsional-vibration damper consists of a closed house, of the swing ring arranged in the house, while the gap between the house and the swing ring is filled up with the viscous liquid. The task of the vibration damper is to minimize i.e. to reduce to a permissible level the torsional-vibration amplitudes of a shaft, thus avoiding high-grade abrasion, noise and in extreme cases shaft fracture. As a consequence, in respect to useful life and endurance, faultless operation of the damper has been of utmost importance. The index characterizing the reliability of the vibration dampers equals the damping coefficient of the damper.

Up to now neither a method nor an apparatus has been known by means of which reliable, quick and serial checking of the damping coefficient of such dampers was possible.

The most often applied testing method, considered as the most reliable for testing vibration dampers, is used in a system where it is intended to reduce an undesired amplitude of the vibration by the use of the damper, for instance in an internal combustion engine, for measuring the vibration in the presence of the vibration damper when built into the system. On the basis of the measured amplitude it can be stated whether the damping coefficient of the torsional-vibration damper of a given nominal geometry complies with the requirements.

Two damping coefficients, $\beta$min and $\beta$max, belong to the permissible maximal amplitude of vibration $\psi$max. In case the damping coefficient lies between these two values, the amplitudes are smaller than the permitted value, consequently the damping coefficient and the operation of the damper can be considered satisfactory. This type of damper is characterized in that the damping coefficient, between the values $\beta$min and $\beta$max, shows an optimal value at which the amplitude of vibration reaches its minimum. Within a relatively wide range in the proximity of the optimal damping coefficient $\beta$opt, the variation of the damping coefficient does not involve a considerable increase of the amplitude.

As a consequence, evaluation of the dampers is the more inaccurate, according to their damping coefficient, by means of measuring the vibration in such an original system, taking the amplitudes of vibration as a basis, the more that value approximates the optimum. In respect of the endurance of the damper and from the point of view of construction and technology, it is not at all indifferent at which part of the interval—defir by $\beta$min and $\beta$max—the damping coefficient of the damper lies.

A further disadvatage of testing the damping coefficient of torsional-vibration dampers of the described type lies in that it is clumsy and expensive, the co-operation of experts is imperative, thus the method is unsuitable for the performace of serial tests.

Tendencies are known that propose to perform the checking of these vibration dampers in a so-called substituting system, differing from the original one, e.g. in a system built up by means of cardan shafts. The common characteristics of these systems lie in that the house of the damper built into the system is forced to a vibration of a defined frequency and amplitude. In this case, due to warming up of the damper, the onset of the thermal balance has to be waited for, and as a consequence, the duration of the checking will not be considerably shorter than with tests performed in the original system. At the same time the accuracy and reliability of the test worsens, and in most cases only rough estimations can be achieved.

The object set was to develop a method by the aid of which quick and serial tests of torsional-vibration dampers become possible that are filled up with a viscous liquid and provided with a swing ring.

Furthermore it has been aimed to develop a measuring method which an unambiguous and accurate relation can be established between the damping coefficient of the torsional-vibration dampers with a given nominal geometry and some easily measurable parameter of the same.

The above-mentioned own patent covers a measuring apparatus that is suitable for the quick realization of the measuring process, not requiring special knowledge, at which vibration dampers can be assembled and changed rapidly and without difficulty, rendering the measuring unit suitable for serial measurements.

It is of utmost importance that at one type of measuring the tested vibration damper can be qualified as "good" at a value which lies between the two limit values, i.e. good and bad, i.e. faulty vibration dampers can be differentiated without a definite evaluation and in case of necessity comparable results can be obtained.

The invention is based on the recognition that within a torsional vibration system with one degree of freedom, consisting e.g. of a torsional shaft and a disc, a well measurable, accurate and unambiguous, numerically characterizable relation can be realized within the range of interest between the damping coefficient of a torsional vibration damper of a given nominal geometry and suitably mounted, e.g. concentrically fixed to the disc, and the number of vibrations of a freely oscillating system.

For this the explanation can be given that the characteristic curve of the number of vibrations plotted against the damping coefficient $\beta'$ shows a minimum at a value $\beta'$opt, i.e. the pertinent number of vibrations n opt represents the lowest possible number of vibrations to be measured in the system. At the effective damping value $\beta'$, when it is lower or higher than $\beta'$opt, the pertaining number of vibrations of the torsional-vibration damper will be higher than n opt.

To achieve a univocal result it is necessary to make a decision as to whether $\beta' < \beta'$opt, which means that the product tested is waste, and when $\beta' > \beta'$opt as the product is to be considered as faultless.

To settle the matter, another suitable control procedure can be used: a duration of vibration T ref, serving as a reference, is compared with the duration of the effective first vibration T of the system incorporating the torsional damper (as it will be described later in detail), and the quality of the damper is decided on the basis of a comparison.

For this purpose another, however more complicated procedure can be used: the torsional damper in question is measured in another system, differing from the previous one only in the spring-stiffness of the torsional shaft.

This is because in this case the characteristic curve "number of vibrations-damping coefficient" deviates from that of the first system, consequently an unambiguous decision can be made.

Summing up what has been said, the measuring method according to the invention, serving for the quick testing of the damping coefficient of torsional-vibration dampers filled up with a viscous liquid and provided with a swing ring, is characterized in one of it aspects in that the permissible extreme values $\beta'$min and $\beta'$max of the torsional vibration damping coefficient—between which the quality of the dampers is acceptable—are determined in a known way for the torsional vibration damper to be tested of a given nominal geometry. Furthermore a relation is established between the damping coefficients mentioned above, in the torsional vibration system provided with the torsional damper to be tested, having one degree of freedom and to be tuned by changing the vibrating mass or spring stiffness of the torsional shaft, and the number of vibrations (number of half-vibrations) n of the decay from a determined initial amplitude to a determined amplitude within the torsional vibration system having a free oscillation with damping.

After having built in the torsional vibration damper to be tested into the torsional vibration system, the latter is brought into a torsional vibrating state, always with an identical initial amplitude, hereafter free oscillation takes place. In accordance with the previously described definition, the number of vibrations (half-vibration) n is measured; hereafter—taking the number of vibrations (half-vibrations) n between the permissible limit values $n_{min}$ and $n_{max}$ as a basis—a fair quality of the vibration damper is stated; if the values lie outside the limit values an inferior quality can be verified.

According to preferred aspects of the inventive method, for quickly checking the damping coefficient of torsional-vibration dampers that are filled with a viscous liquid and are provided with a swing ring, for purposes of quality control of a damper of a given nominal geometry that is being tested, the following steps are suggested: determining permissible limit values of a torsional-vibration damping coefficient, between which values the quality of the damper is acceptable; establishing a relation between the coefficient and the number of vibrations of the decay from a determined initial amplitude to a second determined amplitude within a freely oscillating torsional-vibration system into which the damper is fitted for the testing, having one degree of freedom, i.e. including a disc that constitutes a mass and a torsional shaft that constitutes a spring with a given stiffness; tuning the system by changing one of the mass of the disc and the spring stiffness of the torsional shaft to achieve a well measurable relation within the range of interest between the damping coefficient and the number of vibrations; producing free oscillation with damping within the system with the damper fitted in so that the free oscillation takes place with the determined initial amplitude; measuring the number of the vibrations in the system; and taking the measured number as a basis between permissible limit values, to verify an acceptable quality of the damper, while an inferior quality is being declared at measured values that lie outside the limit values.

Determination of the damping coefficient can be performed in accordance with a method described in the chapter "Untuned Viscous Sheer Dampers" of the book of Nestorides: "A Handbook on Torsional Vibration" (BICERA—Cambridge 1958).

To determine lower or higher ratios in relation to the optimal damping coefficient, measurements can be performed in a further system, that differ from the first only in respect of the spring stiffness of the torsional shaft (max. 0.5-fold, min. the double).

Determination of the lower or higher ratio in relation to the optimal damping coefficient can be performed in accordance with another procedure in such a way that, at the beginning of free oscillation with damping, the effective periodical time, or a quantity proportional to the same is compared to a time $T\beta'$opt, where $T\beta'$opt represents the periodical time of the dampers that show optimum damping within the system used for checking, or a quantity that is proportional to the same.

A preferred, exemplary apparatus for performing the method according to the invention preferably comprises a torsional vibration system having a torsional shaft fixed at one end and supported in bearings at the other, a disc fixed to the same, secured against turning-off, a roller supported in bearings on the rim of the disc, while the mechanism that produces free oscillation and is provided with an energy supply source is connected to the roller. The apparatus furthermore comprises a sensing device arranged on the torsional shaft, and an electronic evaluation unit connected to the sensing device.

It can be considered as advantageous to provide the disc of the torsional vibration system with a hub, and the torsional shaft is then supported in bearings through said hub.

As a most suitable solution, a counter-weight of an appropriate mass, preferably a roller corresponding to the roller on the disc, is fixed on the dics, diagonally opposite the first-named roller. The mechanism producing free oscillation with damping is a cam disc, arranged eccentrically in relation to the roller of the disc fixed on the torsional shaft; the cam disc is arranged on the shaft and can be brought into contact with the roller as its initial position. When the shaft is turned the cam disc turns the roller and the disc, simultaneously twisting the torsional shaft, and when the end of the cam disc overruns the roller, free oscillation with damping takes place in the entire torsional vibration system.

The free oscillation with damping can be achieved by arranging a clutch—for unidirectional transmission of moment—on the shaft of the cam disc, to which the energy source is connected that turns the shaft and the cam disc.

The electronic unit evaluating the process, serves for the determination of a quantity that is proportional to the number of total vibrations, preferably half-vibrations, and contains the earlier-mentioned sensing device that produces a measuring signal proportional to the process. This is, for instance, a measuring bridge consisting of strain gauges and being fixed onto the torsional shaft.

The unit preferably also has an amplifier connected to the measuring bridge, a comparator for indicating that the measuring signal has surpassed a pre-determined minimal amplitude level, a counter for registrating the unidirectional surpasses of the levels, a device for indicating the number of surpasses, and finally a control unit.

From the point of view of serial measurements it is recommended that the electronic unit of the apparatus is made with a part yielding the reference time, incorporating a circuit for comparing the reference time with the effective periodical time, and a holding circuit. The result of comparison can be seen in the indicating device which is provided e.g. red and green lamps. Comparison of the periodical time, combined with the indication of the number of surpasses, can be used for differentiating the good and inferior quality of the torsional-vibrating dampers; as a consequence, serial measurements and selections may be easily accomplished.

It is also recommended to provide the apparatus with two mechanical units for producing the free oscillation with damping, besides the electronic unit. These units differ only in the spring stiffness of their torsional shafts.

It is also advantageous if one or more separate discs are fixed to the disc of the torsional vibration system to promote tuning.

In a preferred embodiment of the apparatus, the energy source of the mechanism producing the free oscillation is formed by one or more parallel-connected air cylinders that are operated by means of an electropneumatic valve.

The advantage of the invention lies in that the checking of the damping coefficient and the operation of the torsional-vibration dampers, filled with a viscous liquid and provided with a swing ring, can be performed in a quick way which was not known up to now.

Taking into consideration that the damping coefficients of the dampers can be differentiated more accurately than ever before, the influence of the parameter affecting the magnitude of the damping coefficients can be checked too, thus optimalized construction and technology, as well as technical and economical advantages can be achieved.

Quick operation and reliability of the apparatus enable testing and supervising the production of torsional-vibration dampers. By its application, the assembly of faulty products can be prevented. By avoiding stresses resulting from detrimental vibrations, the useful life and reliability of valuable machines can be considerably increased.

When performing repairs, a further advantage appears when a positive information is given whether a vibration damper on an internal combustion engine to be repaired can be re-built or not.

A considerable advantage of the invention lies in that the characteristic curve (the maximum vibration amplitude plotted against the number of the vibration) of the original system can be determined by means of relatively few measurements. As a consequence, measurements in the original system can be omitted since the maximal amplitude of vibration to be obtained in the original system, $\psi$max—preferably relating to the harmonic that yields the strongest exitation—can be achieved without difficulty on the basis of the numbers of vibrations.

Further details of the process according to the invention will be described by reference to a preferred embodiment, on the basis of the accompanying drawings, wherein FIG. 1 shows a conventional characteristic curve—a damping coefficient $\beta$ versus an amplitude of vibration $\rho^o$—determined by means of vibrations of identical nominal geometry at the resonance spot of the harmonic that yields the strongest excitation, in an internal combustion engine;

FIG. 5 shows a possible arrangement of a further disc serving for tuning the torsional vibration system.

Figure 1:
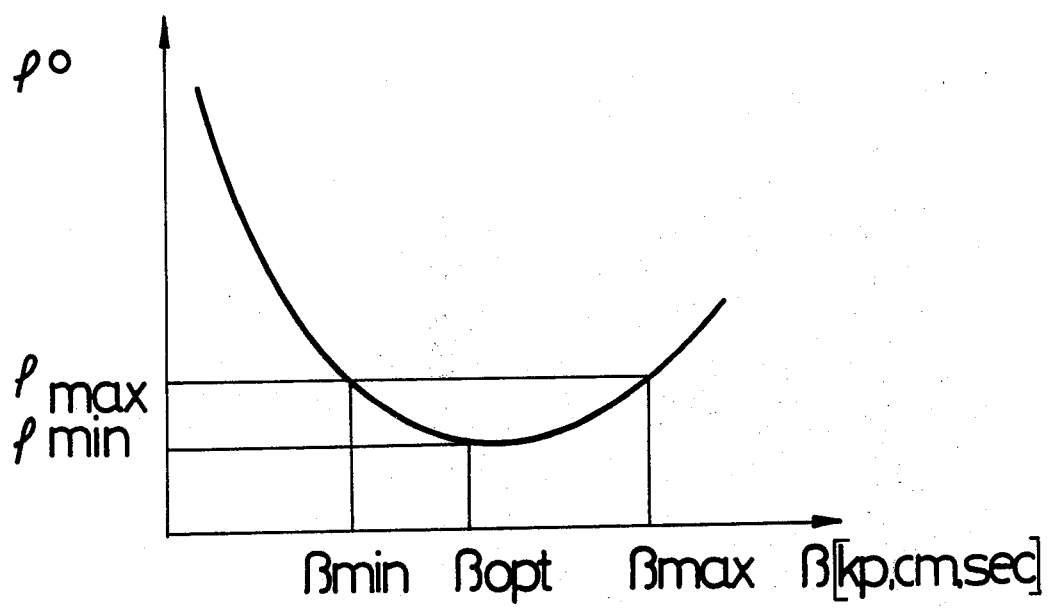

As it is seen in FIG. 1, a course of vibration amplitude of $\rho^o$ is plotted in a known manner against a the damping coefficient $\beta$. A minimum amplitude value, $\rho$min is found at the damping coefficient $\beta$opt. To a permissible maximal amplitude of vibration $\rho$max two damping coefficients belong, namely $\beta$min and $\beta$max. The damping coefficient and the operation of the vibration damper can be considered as complying with the requirements if the damping coefficient falls into an interval defined by the values $\beta$min and $\beta$max.

It can be seen in FIG. 1 that it is rather difficult to determine the position of the damping coefficient of a certain torsional-vibrating damper within the interval, by the available vibration-amplitude data, due to the inconsiderable change of the characteristic curve in the proximity of the optimum damping coefficient $\beta$opt. It should be noted that in practice the curve is flatter than illustrated in FIG. 1. Due to the complexity, slowness and incertainty of the measuring processes, this type of curve is inapt for serving as a basis for serial measurements.

Figure 2:
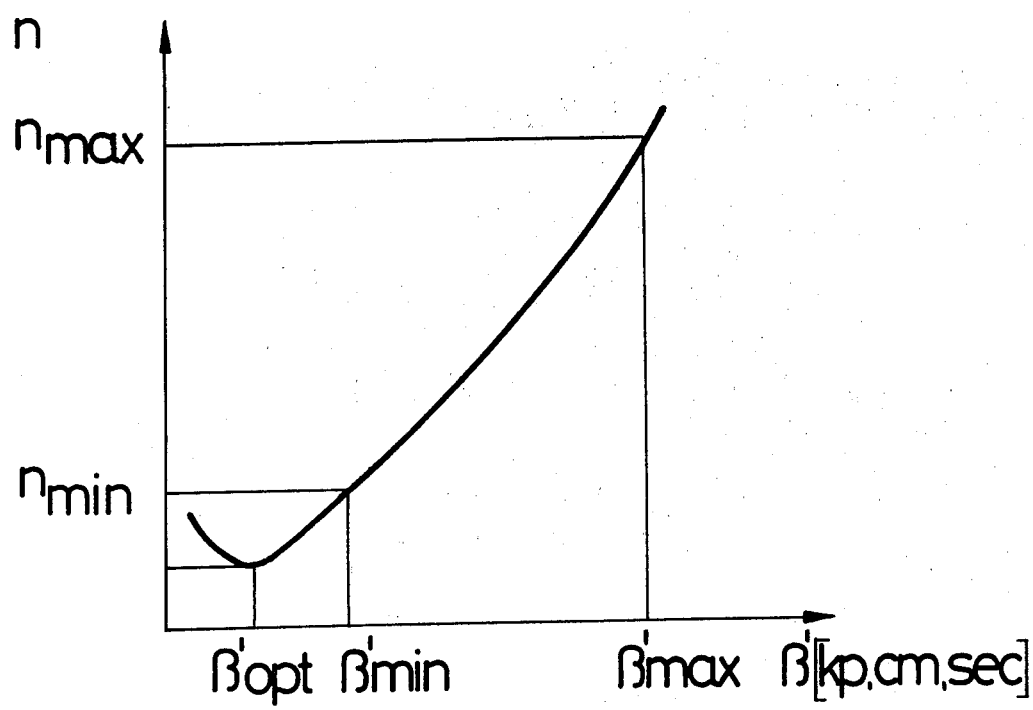
FIG. 2 shows a characteristic curve with a damping coefficient $\beta'$ versus a number of vibration n of the apparatus according to the invention.

In FIG. 2 a characteristic curve "damping coefficient $\beta'$—number of vibrations n" of the apparatus according to the invention is plotted. If we indicate the values of the damping coefficients conforming to the permissible maximal and minimal coefficients $\beta$min and $\beta$max according to FIG. 1, or to values identical, with $\beta'$min and $\beta'$max, it goes without saying that in case of faultless dampers the damping coefficients $\beta'$ will fall into the interval. Nevertheless, as it is seen in the diagram, a minimal value of the damping coefficient $\beta'$opt, related to the number of vibrations n, is considerably differently positioned in relation to $\beta$opt as illustrated in FIG. 1, i.e. it lies outside the interval defined by the damping coefficients $\beta'$min and $\beta'$max.

At the same time the relation between the damping coefficient $\beta'$ and the number of vibrations n within said interval can be considered as practically linear. By taking said curve into consideration, and on the basis of the number of vibrations n determined, the damping coefficients $\beta'$ of the vibration dampers can be differentiated unambiguously and accurately according to the invention.

To achieve the favorable curve of FIG. 2, tuning is performed in the system so that a relation $\beta'$min $\geq 1.5$ $\beta'$opt exists between the optimal and the minimal damping coefficients $\beta'$opt and $\beta'$min. Naturally, minimal and $\beta'$min $\geq 1.5$ $\beta'$opt should exist. Naturally, minimal and maximal damping coefficients that define the interval can result from acceptable deviations in production, or they may conform to values $\beta$min and $\beta$max of FIG. 1. By the former circumstance the checking of production is promoted while in the second case an acceptable operation of the damper can be determined in a system e.g. in an internal combustion engine.

Figure 3:
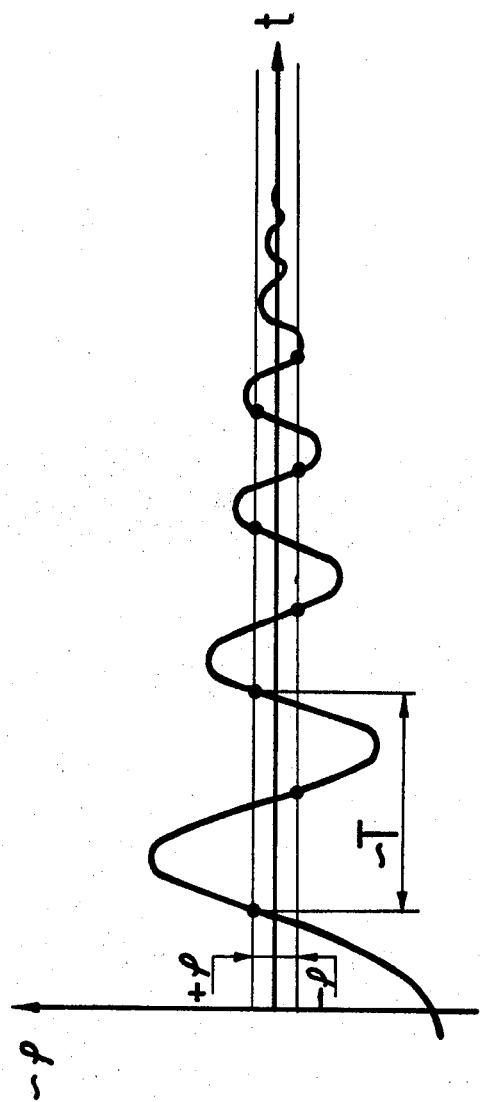
FIG. 3 is a diagram of the free oscillation process with damping, plotted against time.

In the diagram shown in FIG. 2, the number of vibrations or half-vibrations n is determined in such a manner that (as shown in FIG. 3 that relates to the process of free attenuation) the quantity proportional to the angular torsion $\psi^o$ is plotted along one axis while time t is plotted along the other axis. Lines $+\psi$ and $-\rho$ symetrically, drawn in the proximity of the time axis indicate the value at which the half-vibrations are counted, the amplitudes of which surpass the value or are identical with it. The number of half-vibrations thus obtained equals the number of points of intersection indicated in the figure. From the point of view of the inventive process, the time T indicated in FIG. 3 can be considered as a cycle time. In the example illustrated in FIG. 3 the number of half-vibrations amounts to eight.

Figure 4:
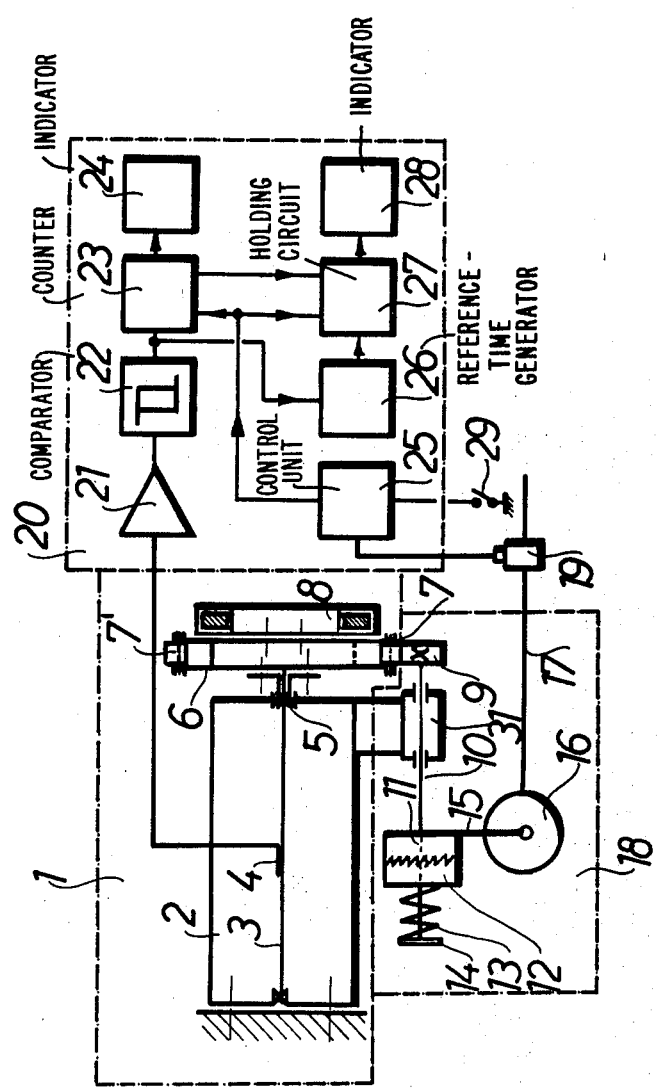
FIG. 4 shows a schematic of a preferred exemplary apparatus.

In FIG. 4 a schematic representation of a preferred, exemplary apparatus can be seen for practising the new method. Essentially, the apparatus consists of three interconnected main parts: a torsional vibration system 1, a mechanism 18 producing free oscillation with damping, and an electronic evaluation unit 20.

The torsional vibrating system 1 incorporates a torsional shaft 3, one end of which is fixed to a supporting device 2, for instance by means of a screw connection not illustrated here, the other end being supported in bearings preferably interposing a hub 5. The hub and a disc 6 are fixed onto the torsional shaft 3 in a non-turnable manner by means of a suitably dimensioned screw connection.

The vibration damper 8 to be tested can be fixed to the disc 6 by means of a screwed connection. On the rim of this disc, a roller 7 is supported in bearings. Diametrally opposite to that roller a body of identical mass, possibly another roller 7', is arranged as a counterweight; bearing support of the roller 7' is not imperative and stationary fixation is sufficient. An eccentric cam disc 9 fixed onto a shaft 10 of the mechanism 18 can be made to engage the roller 7. The shaft 10 is supported in bearings in a console 31 forming a part of the supporting device 2.

Discs 11, 12 of the clutch are suitable for the unidirectional transmission of moment, and they are arranged on the shaft 10; frontal surfaces of the discs 11, 12 engage each other by means of a radial gearing. The disc 12 and the corresponding tracks of the shaft 10 are provided with ribs, partly for the transmission of the moment, and partly for axial guidance of that disc 12, while the disc 11 is arranged on the cam-disc shaft 10 that traverses the disc 11 in a turnable manner.

Discs 11, 12 are compressed by means of a spring 13 supported by a stationary disc 14. Disc 11 is connected to an air cylinder 16 through an arm 15; into an air conduct 17 of the cylinder 16 an electropneumatical valve 19 is installed, the valve being connected to a control unit 25 of the electronic unit 20.

A sensing device 4 of the electronic unit 20—e.g. a bridge consisting of strain gauges—is arranged on the torsional shaft 3, while a terminal of the sensing device 4 is connected to an amplifier 21. A window comparator 22, built up of symmetrical comparators in a known way, indicates the surpass of an output signal of the amplifier 21 across the level indicated by the line $\pm\psi$ in FIG. 3, giving a pulse when the line $+\rho$ is crossed upwards, or the line $-\rho$ downwards. The task of a counter 23 is to count a standardized pulse series of the comparator 22. After decoding, the obtained number is shown by an indicator 24, e.g. with Nixie-tubes.

When performing the selection of torsional dampers it is of utmost importance that the electronic unit 20 contain suitable circuits that are serviceable for comparing the period-time T with the reference time T ref and for indicating the obtained result.

In the given cases two lamps, e.g. a green and a red one may be applied, indicating whether the damping coefficient $\beta'$ of a given torsional damper is greater or smaller than $\beta'$opt. Before beginning the measuring process, one of the lamps (the green one) burns.

If in the course of the following measuring process—the period time T is longer than the adjusted reference time T ref, the holding circuit is triggered, the other lamp (the red one) is lit and stays so as long as results are being registered; thereafter the control unit restores the starting condition.

If, on the other hand, the periodic time T is shorter than the adjusted reference time T ref, triggering of the holding circuit does not take place and the (green) lamp lit before measuring does not go out (or change to the other, the red lamp).

For the determination and indication of ratios, the electronic unit 20 may contain a reference-time generator 26, a comparing and holding circuit 27, as well as an indicator 28. The generator 26, delivering a reference time T$\beta'$opt, is connected to the window comparator 22, and the circuit 27 is connected to the counter 23. The indicator 28 indicates the ratios determined in the circuit 27, containing—as already mentioned—e.g. a green and a red lamp for respectively signalling the good and the faulty quality of the torsional-vibration dampers.

When the process is finished, the red lamp burns and the damper is considered unambiguously faulty, according to the adjustment, if the damping coefficient is less than $\beta'$opt. When the green lamp burns, the damping coefficient is greater than $\beta'$opt; in this case the positive or negative quality of the damper should be determined on the basis of the number of vibrations. Part 29 of FIG. 4 will be described somewhat later.

In FIG. 5 a possible arrangement of a tuning disc 30 is to be seen, serving for tuning the vibrating system 1 and fixed onto the disc 6 of the mechanical construction.

The apparatus according to the invention operates as follows: the vibration damper 8 is mounted onto the disc 6. The electronic cam disc 9 with the shaft 10 is turned to the roller 7, to its starting position, so that—at the beginning of the rotation—the disc 6 and the electronic cam disc 9 contact each other. After pressing a button 29, the electropneumatical valve 19 lets air stream into the cylinder 16, simultaneously the counter 23 is zeroed by the control unit 25. Through the power transmitting chain—consisting of the air cylinder 16, the arm 15, the discs 11, 12, the shaft 10, the cam disc 9 and the roller 7—turning off of the disc 6 is initiated, simultaneously torsion of the shaft 3 takes place.

By that time the cam of the eccentric cam disc 9 slides along the rotating roller 7, and after having left the dead-center position, the moment of the force transmitted to the shaft 10 from the roller 7 onto the cam disc 9 is reversed. As a consequence, the discs 11, 12 of the clutch suitable for unidirectional transmission of the moment, overcome the pressure of the spring 13 and move in relation to each other. The cam disc 9 and the roller 7 are not in contact any more, and the free oscillation of the system takes place with appropriate damping. The measuring signal, proportional to the process, arrives from the sensing device 4 through the amplifier 21 to the window-comparator 22.

When the measuring signal surpasses the levels indicated in FIG. 1, $\pm\psi$, the ground symmetrical comparators are triggered and give a pulse at each single halfperiod. The series of pulses is counted and stored in the counter 23; the result appears in the indicator 28, yielding the number of half-vibrations, that form the basis of the qualification.

In case the control system contains two torsional vibration systems and two mechanisms for producing the free oscillation, as a modification, the individual units of the apparatus operate as described before.

In case if the electronic unit 20 contains the generator 26 for the evaluation of the period time, the circuit 27 and the indicator 28, this unit operates as follows: when the measuring signal passes for the first time the level $\pm\psi$ illustrated in FIG. 3, the pulse coming from the comparator 22 sets the reference-time generator 26 into action that delivers the reference-time $T\beta'$opt, the output signal arrives at the circuit 27. After the time T elapsed corresponding to the effective period time, a signal arrives from the counter 23 to the unit 27. In dependence of the relative timely sequence of arrival of the two signals, triggering of the holding circuit takes place, thus registering, whether the effective period time is shorter or longer than the reference time $T\beta'$opt. By lighting the appropriate one of the lamps, as was described, the result is shown by the indicator 28.

What we claim is:

1. A method for quickly checking the damping coefficient of torsional-vibration dampers that are filled with a viscous liquid and are provided with a swing ring, for purposes of quality control of a damper of a given nominal geometry that is being tested, comprising the steps of: determining permissible limit values $\beta'$min and $\beta'$max of a torsional-vibration damping coefficient, between which values the quality of the damper is acceptable; establishing a characteristic curve of a relation between the damping coefficient and the number of vibrations of the decay from a determined initial amplitude to a second determined amplitude within a freely oscillating torsional-vibration system into which the damper is fitted for the testing, having one degree of freedom, i.e. which system includes a disc that constitutes a mass and a torsional shaft that constitutes a spring with a given stiffness; tuning the system by changing one of the mass of the disc and the spring stiffness of the torsional shaft to achieve a well measurable relation within the range of interest between the damping coefficient and the number of vibrations; producing free oscillation with damping within the system with the damper fitted in so that the free oscillation takes place with the determined initial amplitude; measuring the number of the vibrations in the system upon the characteristic curve and taking the measured number as a basis between permissible limit values $n_{min}$ and $n_{max}$ to verify an acceptable quality of the damper, while an inferior quality is being declared at measured values that lie outside the limit values.

2. The method as defined in claim 1, further comprising the step of using two of the torsional-vibration systems in order to perform said determining step, and for establishing a ratio of the coefficient of the damper being tested versus the optimum coefficient; the second system differing from the first one in respect of the spring stiffness of its torsional shaft, which stiffness is maximum half as much or at least twice as much as the stiffness of the first system.

3. The method as defined in claim 1, further comprising the steps of determining a damping coefficient $\beta'$opt of a plotted characteristic curve "number of vibrations versus a torsional damping coefficient $\beta'''$" that is established in the system; and adjusting the system by said tuning step to achieve a relation of 1.5 $\beta'$opt$<\beta'$min.

4. The method as defined in claim 1, further comprising the step of comparing at the beginning of the free oscillation process one of the effective period time and of a proportional quality with a time $T\beta'$opt in order to perform said determining step, where $T\beta'$opt represents a period time of the damper being tested when it shows one of the optimum damping and a proportional quantity within that system which serves for control purposes.

* * * * *